Patented Oct. 18, 1932

1,883,014

UNITED STATES PATENT OFFICE

TSUTOMU SHIOMI, OF YEBARA-CHO, YEBARA-GUN, AND SHOKICHI HIGUCHI, OF OMORI-MACHI, YEBARA-GUN, TOKYO PREFECTURE, JAPAN, ASSIGNORS TO FURUKAWA DENKI KOGYO KABUSHIKI KAISHA, OF TOKYO, JAPAN

METHOD OF MANUFACTURING STORAGE BATTERY PLATES

No Drawing. Application filed January 2, 1929, Serial No. 329,945, and in Japan January 17, 1928.

This invention relates to a method of manufacturing storage battery plates.

When molten lead is stirred with the addition of one or more lead oxides such as litharge or red lead, so-called lead ash is prepared. We have found that this lead ash consists of coarse and porous particles which can be easily pulverized by mechanical means. For these means, a specially constructed impact pulverizer with an air separator is best and when the lead ash is pulverized thereby a fine mixture of metallic lead and one or more of lead oxides can easily be obtained.

The present invention relates to a method of manufacturing storage battery plates by preparing lead ash, pulverizing same by mechanical means, kneading the powdery mixture thus obtained together with an appropriate solution, for instance, a dilute aqueous solution of sulphuric acid, and filling the grid with the paste thus obtained.

One of the features of the invention is that it includes the step of preparing lead ash by stirring molten lead with the addition of one or more of lead oxides such as litharge, red lead or especially lead which is produced massively as waste when the lead is molten. Therefore this method of preparing lead ash is of the most economical for the preparation of coarse and porous particles easily pulverizable mechanically, while the extent of oxidation of the molten lead therein is moderate and proper.

Also in the above operations, the step of pulverizing the lead ash by mechanical means, and especially by an impact pulverizer, is very important. When the lead ash is not subjected to this step, not only the size of the particles of the lead ash is not uniform and fine, the form thereof is chiefly round even when the size thereof is uniform and fine to sufficient extent, so that such powdery lead ash is unsuitable for active material of the paste. When the lead ash is pulverized by mechanical means such as by the impact propeller, not only is it finely pulverized, but also the form of the particle becomes irregular so that it becomes a very suitable active material for the paste. This fact was found by the inventor after a series of experiments.

Moreover, in the manufacture of pasted storage battery plates, both density and porosity of the so-called active material have a very important relation to the capacity and life of the plates. As a rule, it is desirous that the density of the active material be high. However, when density is high, porosity is low and therefore there is a tendency for the plate capacity to become less and for so-called buckling of the plate to be induced. On the contrary, when the density of the active material is low, the porosity is high and therefore, although the initial capacity may be comparatively large, there is the drawback that the active material is apt to fall out of the grid easily and accordingly the life of the plates is shortened. Density and porosity of the active material are not only affected by physical properties of the paste material, for instance, fineness of particles, but also greatly by the chemical composition of same. For instance, when two pastes of equal hardness are made, one of lead powder and the other of red lead or litharge and the grids are filled with such different pastes and formed, the density and porosity in the respective active materials differ greatly from each other. The apparent density of lead powder is high, so that, when this is formed into active material for a positive plate, viz. lead peroxide, the volume expansion of the same is remarkable, while the volume contraction of the same, when formed into active material for the negative plate, viz. spongy lead, is very small. Therefore the active material made of lead power has the drawback that its porosity is very low although its density is high. On the contrary, the apparent density of litharge or red lead is low, so that, when they are formed into lead peroxide, the volume expansion is small while when formed into spongy lead, the volume contraction is large. Therefore the active material made of such materials has the drawback that its density is very low although its porosity is high.

The paste material employed in this invention is prepared by pulverizing coarse particles of the mixture of metallic lead and lead oxide such as litharge or red lead as before stated and therefore it consists of a uniform mixture of a fine powder of metallic lead and lead oxide. In this invention, as such paste material, which is chemically active, is employed, not only good coherent paste can be prepared therefrom, but also, when it is formed into active material, the reduction of its porosity is lessened while a comparatively high density of the same is maintained. Therefore the above mentioned drawbacks in known paste materials are entirely obviated and thus a new active material, having a proper density as well as a proper porosity can be obtained. By employing such new paste material, excellent pasted storage battery plates can be easily prepared which are liable to no falling out of the active material from the grids as well as with no buckling and with large capacity and long life.

According to the invention, as good pasted storage battery plates can be prepared in an easy manner from the material and cheaper than mere litharge or red lead, the cost for the manufacture of the new plates can be materially reduced.

We claim:

A method of manufacturing storage battery plates, consisting in a step of preparing lead ash which is a mixture of coarse lead particles and lead oxides, by stirring molten lead added with lead oxides, a step of finely pulverizing said lead ash mechanically to prepare a powdery mixture of lead and lead oxides, a step of kneading said powdery mixture with a solution to prepare a paste, and a step of filling grids with said paste, substantially as described.

In testimony whereof we affix our signatures.

TSUTOMU SHIOMI.
SHOKICHI HIGUCHI.